Patented June 1, 1948

2,442,721

UNITED STATES PATENT OFFICE 2,442,721

BENZOIC ACID ESTERS OF SECONDARY ALKYLAMINO PROPANOLS

Arthur C. Cope, Englewood, N. J., assignor to Sharp & Dohme, Incorporated, Philadelphia, Pa., a corporation of Maryland No Drawing. Application October 5, 1943, Serial No. 505,040

5 Claims. (Cl. 260—472)

This invention relates to new esters of p-amino benzoic acid which have valuable properties for use as local anesthetics. In general, the new compounds combine high effectiveness with relatively low toxicity and are relatively non-irritating. These new anesthetics may be used by infiltration or injection or for surface anesthesia, for example, for application to the eye.

The new anesthetics are amines, that is, bases, and will ordinarily be used in the form of salts, for example, as a hydrochloride, sulfate, sulfamate, tartrate, glycolate or other salt, as the free bases themselves are quite insoluble in water. The salt should have sufficient solubility in water to be completely soluble in the concentrations used, which are usually of the order of 1% or less, should be capable of proper crystallization, etc. The hydrochlorides and the glycolates are among the salts particularly useful for therapeutic purposes.

The new compounds of the invention are the esters of p-amino benzoic acid with alkyl amino propanols in which the alkyl group is a secondary group and has from 5 to 9 carbon atoms. These new compounds may be represented by the type formula:

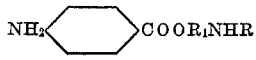

in which R represents a secondary alkyl group having 5 to 9 carbon atoms and $R_1$ represents a propylene group. It will be noted that these compounds are secondary amines, that is, the amino group to which is attached the secondary alkyl group and the propanol group is a secondary amino group, because two of the three hydrogens of ammonia have been replaced. To avoid confusion in terminology in the expression "secondary alkyl amino" as used in this specification and the appended claims, the term "secondary" will modify the term "alkyl" only, with the understanding that in every case the amino group is secondary.

The new compounds are prepared by reacting p-nitro benzoyl chloride or other halide or p-nitro benzoic anhydride with a salt of the alkyl amino alcohol, and reducing the resulting nitro benzoyl ester, catalytically or otherwise. An advantageous process involves condensing the p-nitro benzoyl compound with salts of secondary alkyl amino alcohols. The alkyl amino alcohols used as salts for the production of the p-nitro benzoyl esters are advantageously prepared by condensing the corresponding ketone with the corresponding amino alcohol and reducing.

Because of the convenience of purification and availability of the intermediates, the compounds will ordinarily be prepared by condensing p-nitro benzoyl chloride with the hydrochloride of the alkyl amino alcohol, and the ester produced in the form of the hydrochloride. If another p-nitro benzoyl halide, for example, the bromide, is used, or if the corresponding anhydride is used, other salts of the amino alcohol than the hydrochloride may be used.

If the nitro ester is produced as the hydrochloride, it may be subjected in that form to reduction to produce the corresponding salt of the p-amino benzoic acid ester and the final product may be purified and used as the hydrochloride. On the other hand, if the p-nitro benzoate is produced as a salt with some other acid, it may be subjected to reduction in such form, or may be converted to the free base and reduced, in which case the final product will be the p-amino benzoate as the corresponding salt or the free base and may be purified and used as such. Further, if the p-amino benzoate is produced in the form of a salt with any given acid, it is readily converted to the salt of some other acid, by treatment with alkali to liberate the free base and subsequent neutralization with the desired acid. If the free base is prepared, it may, of course, be converted to the salt with any desired acid by simple neutralization. The conversion of the salt of the p-amino benzoate with one acid to the salt with another acid, or to the free base, or the neutralization of the free base to form salts, involve procedures which are well known to those skilled in the art and require no detailed description herein.

The invention will be further illustrated by the following specific examples, but it is not limited thereto.

*Example I.*—The preparation of p-amino benzoic acid esters of 2-(4-heptylamino)-1-propanol.

17.3 parts of 2-(4-heptylamino)-1-propanol (prepared, for example, as described in application Serial No. 344,163, now abandoned) are dissolved in 30 parts of chloroform and the solution is saturated with dry hydrogen chloride gas with cooling. 18.6 parts of p-nitrobenzoyl chloride dissolved in 30 parts of chloroform are added and the mixture is heated under a condenser in a bath at 50–65° C. for two to four days. The solvent is removed in vacuum and the residual oil is boiled with absolute alcohol. Dry ether is added and the solution is cooled. The crystalline p-nitrobenzoate hydrochloride is filtered and purified by recrystallization from acetone; M. P.

125–127° C. The p-nitro benzoate hydrochloride obtained is suspended in 200 to 500 parts of distilled water and hydrogenated in the presence of one part of palladinized charcoal catalyst at room temperature. When reduction is complete, the catalyst is removed by filtration in an atmosphere of carbon dioxide and the filtrate concentrated to dryness in a vacuum. The p-amino benzoate hydrochloride is obtained as a white crystalline salt melting at 164–166° C. If, instead of the hydrochloride, the free base is desired, it is readily prepared by dissolving or suspending the hydrochloride in a small volume of alcohol, diluting with water and treating with an excess of sodium carbonate. The free base which is liberated is extracted with benzene. If a salt with an acid other than hydrochloric acid is desired, it is simply necessary to add to the solution of the free base, e. g., in benzene, the stoichiometric quantity of any suitable acid, evaporation of the solvent and crystallization giving the pure salt.

In the foregoing example, the reduction to form the amino compound is described as carried out by catalytic reduction in water using palladium supported on charcoal as the catalyst. This reduction may be carried out with the use of other liquids, for example, mixtures of water and alcohol, acetic acid and water or other liquids. Other catalysts than palladium, such as platinum, copper chromites, nickel, or the like, may be used with appropriate adjustment of the hydrogen pressure and temperature. If the nitro compound is reduced as a salt which through its acidic reaction would attack base metal catalysts such as nickel or copper chromite, noble metal catalysts are used. Chemical reduction may, of course, be used.

Among the p-amino benzoic acid esters of secondary alkylamino propanols which are included in the invention and have valuable properties for local anesthetic uses are the esters of the following:

1-[4-(2,6-dimethylheptyl)-amino]-2-propanol
2-(3-pentylamino)-1-propanol
2-[4-(2,6-dimethylheptyl)-amino]-1-propanol
3-(3-pentylamino)-1-propanol
1-(3-pentylamino)-2-propanol
1-(4-heptylamino)-2-propanol
2-(5-nonylamino)-1-propanol
1-[2-(4-methyl pentyl)-amino]-2-propanol
2-(4-heptylamino)-1-propanol
1-(5-nonylamino)-2-propanol
3-(2-heptylamino)-1-propanol
3-(4-heptylamino)-1-propanol
3-(2-octylamino)-1-propanol
3-[4-(2,6-dimethylheptyl)-amino]-1-propanol Of particular importance are the p-amino benzoic acid esters derived from sec. alkyl amino alcohols in which the amino group and the hydroxyl group are linked to contiguous carbon atoms as these compounds apparently are superior to the compounds in which these two groups are linked to different carbon atoms which in turn are separated by another carbon atom.

I claim:

1. As new therapeutic agents, p-amino benzoic acid esters of secondary alkylamino propanols, in which the secondary alkyl group has from 5 to 9 carbon atoms.

2. As new therapeutic agents, p-amino benzoic acid esters of secondary alkylamino propanols, in which the secondary alkyl group has from 5 to 9 carbon atoms and in which the secondary alkylamino group and the hydroxyl group are linked to contiguous carbon atoms.

3. The p-amino benzoate of 2-(3-pentylamino)-1-propanol.

4. The p-amino benzoate of 2-(4-heptylamino)-1-propanol.

5. The p-amino benzoate of 2-[4-(2,6-dimethylheptyl)-amino]-1-propanol.

ARTHUR C. COPE.

REFERENCES CITED

The following references are of record in the file of this patent:

UNITED STATES PATENTS

| Number | Name | Date |
| --- | --- | --- |
| 1,513,730 | Adams et al. | Nov. 4, 1924 |
| 1,590,792 | Adams et al. | June 29, 1926 |
| 2,139,818 | Goldberg | Dec. 13, 1938 |
| 2,252,713 | Goldberg | Aug. 19, 1941 |